United States Patent
Webb et al.

(10) Patent No.: US 11,122,590 B2
(45) Date of Patent: *Sep. 14, 2021

(54) ALLOCATION OF WIRELESS ACCESS INTERFACE RESOURCES

(71) Applicant: Convida Wireless, LLC, Wilmington, DE (US)

(72) Inventors: Matthew William Webb, Basingstoke (GB); Hideji Wakabayashi, Basingstoke (GB)

(73) Assignee: Convida Wireless, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/199,393

(22) Filed: Nov. 26, 2018

(65) Prior Publication Data

US 2019/0098647 A1    Mar. 28, 2019

Related U.S. Application Data

(63) Continuation of application No. 15/021,469, filed as application No. PCT/EP2014/069108 on Sep. 8, 2014, now Pat. No. 10,154,511.

(30) Foreign Application Priority Data

Sep. 26, 2013    (EP) .................................. 13186246

(51) Int. Cl.
*H04W 72/12*    (2009.01)

(52) U.S. Cl.
CPC ........ *H04W 72/1242* (2013.01); *H04W 72/12* (2013.01); *H04W 72/1205* (2013.01)

(58) Field of Classification Search
CPC ......... H04W 72/1242; H04W 72/1205; H04W 72/12

See application file for complete search history.

(56) References Cited

U.S. PATENT DOCUMENTS 8,081,660 B2    12/2011    Park et al.
9,769,805 B2 *    9/2017    Bergstrom ........ H04W 72/1242
(Continued)

FOREIGN PATENT DOCUMENTS

| CN | 102685895 A | 9/2012 |
| WO | 2011/087406 A1 | 7/2011 |
| WO | 2012/122924 A1 | 9/2012 |

OTHER PUBLICATIONS

"Digital cellular telecommunications system (Phase 2+); Universal Mobile Telecommunications System (UMTS); LTE; Policy and charging control architecture" ETSI TS 123 203 V11.10.0 Jun. 2013 184 pages.
(Continued)

*Primary Examiner* — Ian N Moore
*Assistant Examiner* — Latresa A McCallum
(74) *Attorney, Agent, or Firm* — BakerHostetler

(57) ABSTRACT

A communications system communicating data to/from a communications terminal includes infrastructure equipment forming a mobile communications network to transmit/receive data to/from the communications terminal via a wireless access interface, the communications terminal configured to transmit/receive data to/from the infrastructure equipment. The communications terminal can receive transmission data to the infrastructure equipment at a buffer, transmit a resource request message requesting resources of the wireless access interface to the infrastructure equipment in response to receiving the data for transmission to the infrastructure equipment, and receive a resource allocation message from the infrastructure equipment. The resource allocation message allocates resources of the wireless access interface to the communications terminal. A characteristic of the resource request message transmitted by the communications terminal to the infrastructure equipment provides an indication of one of a predetermined set of transmission priority levels for transmitting the buffered data to the infrastructure equipment.

18 Claims, 10 Drawing Sheets

(56) References Cited

U.S. PATENT DOCUMENTS

| | | | |
|---|---|---|---|
| 2010/0105401 A1 | 4/2010 | Chun et al. | |
| 2010/0135233 A1* | 6/2010 | Ono | H04W 72/1252 |
| | | | 370/329 |
| 2010/0202420 A1 | 8/2010 | Jersenius et al. | |
| 2010/0240385 A1 | 9/2010 | Lohr et al. | |
| 2012/0033628 A1* | 2/2012 | Eriksson | H04W 72/1284 |
| | | | 370/329 |
| 2012/0039263 A1* | 2/2012 | Moberg | H04W 72/1284 |
| | | | 370/329 |
| 2012/0269154 A1 | 10/2012 | Wang et al. | |
| 2012/0307700 A1 | 12/2012 | Nordberg et al. | |
| 2013/0272236 A1* | 10/2013 | Beale | H04W 72/042 |
| | | | 370/329 |
| 2013/0343293 A1 | 12/2013 | Jersenius et al. | |

OTHER PUBLICATIONS

"LTE; Evolved Universal Terrestrial Radio Access (E-UTRA) and Evolved Universal Terrestrial Radio Access Network (EUTRAN); Overall description; Stage 2" ETSI TS 136 300 V11.6 0 Jul. 2013 223 pages.

"Digital cellular telecommunications system (Phase 2+); Universal Mobile Telecommunications System (UMTS); LTE; Vocabulary for 3GPP Specifications" ETSI TR 121 905 V11.3.0 Jan. 2013 65 pages.

"LTE; Evolved Universal Terrestrial Radio Access Network (E-UTRAN); Architecture description" ETSI TS 136 401 V11. 1.0 Jan. 2013 22 pages.

"LTE; Evolved Universal Terrestrial Radio Access (E-UTRA); Physical layer procedures" ETSI TS 136 213 V11.3.0 Jul. 2013 178 pages.

"LTE; Evolved Universal Terrestrial Radio Access (E-UTRA); Medium Access Control (MAC) protocol specification" ETSI TS 136 321. V10.8.0 Apr. 2013 56 pages.

"Scheduling request triggering criterions for LTE" 3GPP TSG-RAN WG2 #59bis Tdoc R2-074048 Ericsson XP050136683 Oct. 2007 pp. 1-4.

International Search Report dated Nov. 26, 2014 in PCT/EP2014/069108 filed on Sep. 8, 2014.

Office Action dated Nov. 6, 2017 in European Patent Application No. 14 759 238.0.

Search Report and Office Action issued in Chinese Application 2014800528190 dated Aug. 24, 2018.

* cited by examiner

ALLOCATION OF WIRELESS ACCESS INTERFACE RESOURCES

CROSS-REFERENCE TO RELATED APPLICATION

The present application is a continuation of U.S. application Ser. No. 15/021,469, filed Mar. 11, 2016, which is a National Stage Application based on PCT/EP2014/069108, filed Sep. 8, 2014, and claims priority to European Patent Application 13186246.8, filed in the European Patent Office on Sep. 26, 2013, the entire contents of each of which being incorporated herein by reference.

FIELD OF DISCLOSURE

The present invention relates to communications systems, infrastructure equipment, and communications terminals for communicating data, and methods of communicating data.

BACKGROUND OF DISCLOSURE

Extending mobile communications network coverage, increasing network capacity, and increasing the variety of devices served are all aspects for which improvement is desired of next generation mobile communications networks. This increase in capacity and variety of devices may in turn lead to a significant increase in the number of communications devices served by mobile communications networks. For example, the increased capacity and coverage of next generation communications networks such as 3GPP long term evolution (LTE) have led to proposals for the use of machine type communications (MTC) devices. MTC devices are typically low-data rate devices that only occasionally communicate with infrastructure equipment in a communications network and may for example be smart utility meters and information gathering devices in cars or personal medical equipment. Accordingly, because of the potential ubiquity of MTC devices, their use may lead to large increases in the number of communications devices being served by a network. Consequently, congestion of the network may be more likely to arise and communications devices may be unable to receive a desired quality of service from the network. This may occur in particular in the uplink from communications devices to infrastructure equipment where network resources are required to be requested before transmission of user data. For instance, if a large number of communications devices wish to transmit in the uplink, a large number of resource requests may be transmitted within a short period of time. This may lead to congestion and inefficient resource allocation, repeated requests for resources and a reduction in the quality of service provided to communications devices.

SUMMARY OF DISCLOSURE

According to an example embodiment of the present disclosure, a communications system for communicating data to and from a communications terminal is provided. The communications system comprises infrastructure equipment for forming a mobile communications network, the infrastructure equipment being arranged to transmit data to and receive data from the communications terminal via a wireless access interface. The communications terminal is configured to receive data for transmission to the infrastructure equipment at a buffer, to transmit a resource request message for requesting resources of the wireless access interface to the infrastructure equipment in response to receiving the data for transmission to the infrastructure equipment, and to receive a resource allocation message from the infrastructure equipment. The resource allocation message allocates resources of the wireless access interface to the communications terminal and a characteristic of the resource request message transmitted by the communications terminal to the infrastructure equipment provides an indication of one of a predetermined set of transmission priority levels for transmitting the buffered data.

The provision of an indication of the priority of the buffered data to the infrastructure equipment can be provided via a priority associated with a resource request message. This allows the infrastructure to take into account the priority of the buffed data when allocating resource of the wireless access interface to the communications terminal or otherwise dealing with the resource request message. Without such an indication, prioritisation may only be taken into account once subsequent data is transmitted to the infrastructure equipment in the allocated resources, thus possibly increasing a delay associated with transmitting the buffered data. Furthermore, the use of a characteristic of the resource request message as opposed to additional signalling bits allows priority to be signalled without reducing the information transmitted or utilising additional resources. According to another example embodiment, the infrastructure equipment is configured to receive the resource request message from the communications terminal, to allocate resources in the wireless access interface in response to receiving the resource request message, to generate a resource allocation message indicating the allocated resources, and to transmit the resource allocation message to the communications terminal, the allocation of resources in the wireless access interface being dependent upon the priority of the buffered data.

This feature allows the allocation of resources associated with the transmission of high priority data to have precedence over those associated with lower priority data. This may in turn lead to more efficient resource allocation and an increased likelihood that quality of service requirements will be satisfied. Power consumption at a communications terminal may also be reduced because resource requests for high priority data can be identified and prioritised so that a number of repeated transmissions of resource request messages can be reduced as a result of more prompt resource allocation.

According to another example embodiment, the communications terminal is configured to transmit a buffer status report message to the infrastructure equipment in the allocated resources, the buffer status report providing an indication of a size of the buffered data.

This feature allows the sending of the buffer status report, which includes additional information on the nature and quantity of data to be transmitted to the infrastructure equipment, to be prioritised and hence in turn the transmission of the buffered data to be prioritised.

According to another example embodiment, there are a set of plurality of priority levels and the indication indicates one of the plurality of priority levels. In one example, the set of priority levels are determined and communicated to the communications terminal by the infrastructure equipment. For example the set of priority levels may be communicated as system information, which is for example broadcast to all communications terminals communicating via the infrastructure equipment or the mobile communications network.

This allows resource request messages of different priorities to be differentiated via a standardised measure of priority such that multiple communication terminals can indicate a priority associated with a resource request message.

According to another example embodiment, the wireless access interface is temporally divided into a plurality of subframes, and the communications terminal is configured to transmit the resource request message in a subset of the plurality of subframes.

This allows the infrastructure equipment to recognise a resource request message by the subframe in which it is transmitted. This therefore allows low complexity signalling to be used for the resource request message.

According to another example embodiment, the characteristic of the resource request message is a timing of transmission of the resource request message relative to the subset of subframes.

This feature allows the communication terminal to indicate priority without including any additional information in the resource request message itself, thus reducing the additional resources of the wireless access interface required to indicate a priority associated with a resource request message.

According to another example embodiment, the characteristic of the resource request message is an amplitude of the resource request message.

This feature allows the communication terminal to indicate priority without including any additional information in the resource request message itself, thus reducing the additional resources of the wireless access interface required to indicate a priority associated with a resource request message.

According to another example embodiment, the communications terminal comprises a plurality of antennas for transmitting data to the infrastructure equipment, and the characteristic is the one or more antennas from which the resource request message is transmitted.

This feature allows the communication terminal to indicate priority without including any additional information in the resource request message itself, thus reducing the additional resources of the wireless access interface required to indicate a priority associated with a resource request message. According to another example embodiment, the characteristic is the resources within a subframe in which the resource request message is transmitted.

This feature allows the communication terminal to indicate priority without including any additional information in the resource request message itself, thus reducing the additional resources of the wireless access interface required to indicate a priority associated with a resource request message. Various further aspects and embodiments of the disclosure are provided in the appended claims, including, but not limited to, a communications terminal, infrastructure equipment and methods of communicating data between a communications terminal and in infrastructure equipment.

BRIEF DESCRIPTION OF THE DRAWINGS

Embodiments of the present disclosure will now be described by way of example only with reference to the accompanying drawing in which like parts are provided with corresponding reference numerals and in which.

DETAILED DESCRIPTION OF EXAMPLE EMBODIMENTS

Figure 1:
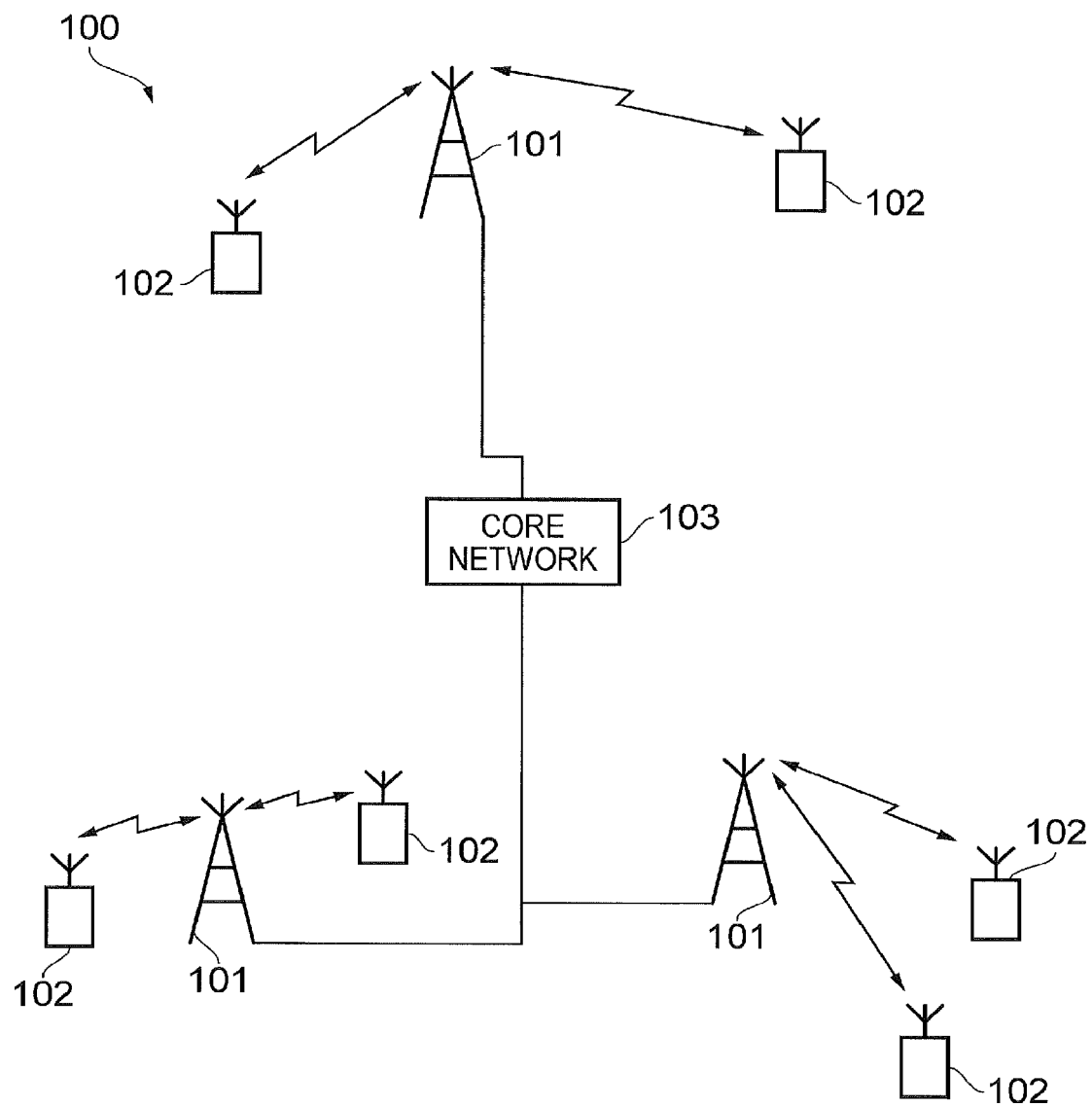
FIG. 1 provides a schematic diagram of an example mobile communications system.

FIG. 1 provides a schematic diagram of an example mobile communications network 100. The mobile communications network includes infrastructure equipment 101 which is arranged to provide a wireless access interface and serve communications terminals 102 within a coverage area or cell. Signals representing downlink data are transmitted from the infrastructure equipment and received by the communication terminals via the wireless access interface, and signals representing uplink data are transmitted by the communication terminals and received by the infrastructure equipment via the wireless access interface. The infrastructure equipment may be communicatively linked via a core network to other infrastructure equipment which may in turn be linked to further communications networks. The infrastructure equipment may also be referred to as a base station or an enhanced node B (eNodeB) and the communications terminals may be referred to as user equipment (UE), mobile devices and user devices etc., where these devices may take the form of smart phones, tablet computers or machine type communications (MTC) devices for example. In some examples the communications network of FIG. 1 may operate in accordance with 3GPP Long Term Evolution (LTE) where the communication terminals also operate in accordance with LTE.

In one example the wireless access interface of the network 100 may operate in accordance with LTE and be provided by an orthogonal frequency division multiplexing interface in the downlink from the eNodeB to the UE. In the uplink from the UE to the eNodeB the wireless access interface may be provided by a single carrier frequency division multiplexing interface. In LTE the allocated spectrum is divided in frequency into a plurality of orthogonal subcarriers and the wireless access interface is temporally divided into radio frames of 10 ms which are themselves divided in to 1 ms subframes. Each subframe may then be used for either downlink or uplink communications depending on the configuration of the network. The resources of the wireless access interface may also be divided further into resource blocks which are formed from 12 subcarriers over a period of half a subframe i.e. 0.5 ms. Each subframe can include user plane and control plane data, where for example in uplink subframes the control plane data are conveyed across a physical uplink control channel (PUCCH) and user plane data conveyed across a physical uplink shared channel (PUSCH). In LTE networks, downlink resources are not required to be requested by a UE because the downlink data transmission is controlled by the serving eNodeB, however, uplink data is generated and transmitted by UEs after storage in a buffer at the UE. Consequently, resources in uplink subframes are required to be allocated to different UEs by a serving eNodeB either via periodic allocations or as a result of a resource request by the a UE, where the UE resource allocations are transmitted to a UE in a resource allocation message. The data transmitted in the uplink by a UE may include control data, resource requests, status reporting data and user data, each of which may have different quality of service and priority requirements. Accordingly, each of these data types may be treated differently by the eNodeB in terms of resource allocation and scheduling.

Scheduling decisions for both uplink and downlink transmission are taken by a scheduler at the serving eNodeB. In the downlink, the eNodeB knows how much data is to be transmitted to each UE, but in the uplink data is buffered at a UE prior to transmission, so the UE is required to send some information regarding its buffer status to the eNodeB. In LTE this buffer information is sent in a buffer status report which is transmitted over the PUSCH. Such buffer status reports are six bits long, and a UE may send either one or four buffer status reports at a time, where the reports include the number of bytes stored in various buffers at the UE. Each buffer status report corresponds to a group or groups of logical channels and therefore represents data which is to be transmitted from a respective logical channel group.

A buffer status report may either be regular, periodic or padding. A periodic buffer status report is transmitted when an associated timer, which is user to regulate buffer status reporting, expires. A padding buffer status report is transmitted when there is sufficient spare capacity to accommodate a buffer status report in a medium access control (MAC) protocol data unit (PDU) which is to be transmitted to the infrastructure equipment. A regular buffer status report may be transmitted in a number of different scenarios, for example when Data arrives for a logical channel which has higher priority than the logical channels whose buffers previously contained data;

Data becomes available for any logical channel when there was previously no data available for transmission;

A buffer status report retransmission timer expires and there is data available for transmission.

As previously described, uplink data may be transmitted across the PUSCH in resources which have been allocated to a UE. However, if the UE does not have sufficient PUSCH resources to transmit a regular buffer status report, it may instead transmit a resource request message for requesting resources of the uplink wireless access interface (PUCCH) so that a buffer status report can be transmitted. Once a buffer status report has been received by the eNodeB a subsequent resource allocation can be sent to the UE for transmission of some or all of its buffered data.

The resource request message may also be referred to as a scheduling request because it is in effect requesting that the eNodeB schedule resources for the UE.

If the current configuration of the UE does not allow a resource request message to be sent on PUCCH or once a resource request counter has expired, sufficient uplink resources are yet to be allocated to the UE, the UE may instead initiate a random access procedure during which it transmits a resource request message for requesting uplink resources. This preference to transmit a resource request message on PUCCH is because it can be faster and more efficient than commencing an entire random access procedure.

Depending on the message being transmitted to the eNodeB from the UE on the PUCCH, different message formats may be used. For example, when a UE transmits a resource request message it uses format 1/1a/1b, when a UE transmits channel state information it uses format 2/2a/2b and when a UE transmits a resource request message and carrier aggregation is in operation, a format 3 can be used. These various formats are transmitted in predetermined resource blocks of the PUCCH and further detail can be found in the LTE specification.

Figure 2:
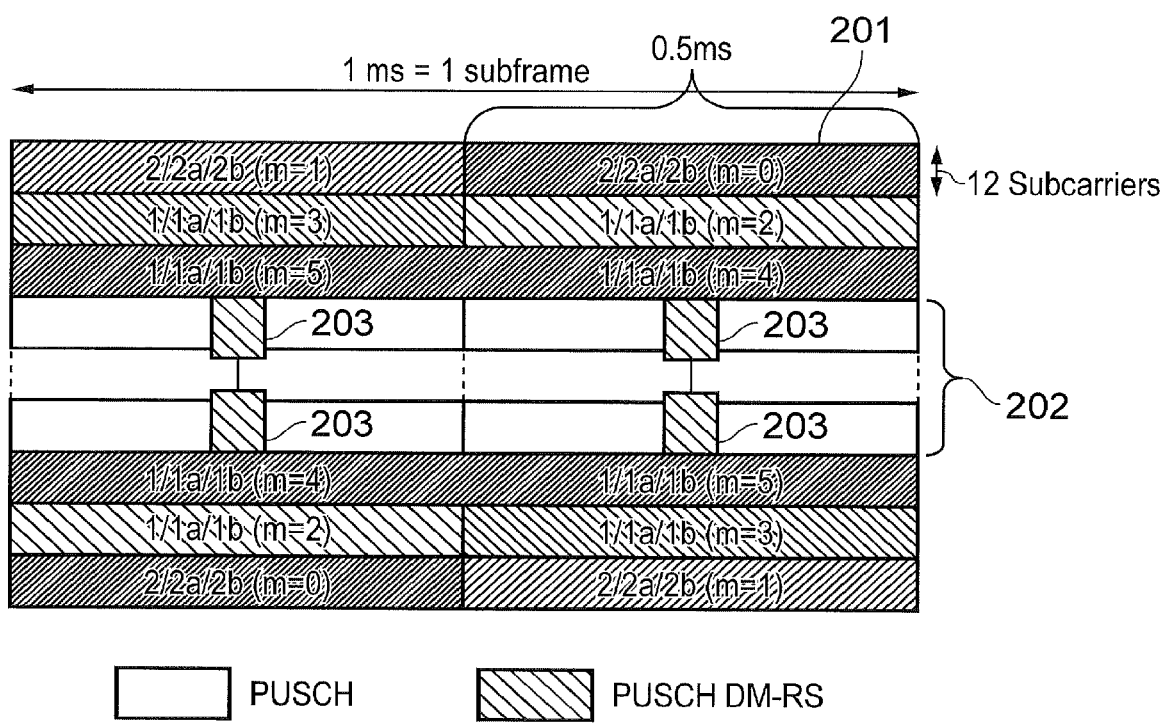
FIG. 2 provides a schematic diagram of physical uplink control channel resource block allocations in a 3GPP long term evolution (LTE) communications system.

In LTE systems logical resource blocks in the PUCCH are indexed over a range m=0 . . . $N_{RB}^{HO}-1$. The lowest numbered $N_{RB}^{(2)} \geq 0$ logical resource blocks are for format 2/2a/2b and/or format 3; the next up to one logical resource block can contain both formats 1/1a/1b and 2/2a/2b; and the following logical resource blocks are for format 1/1a/1b. The logical resource blocks m are mapped to physical resource blocks as shown in FIG. 2. In FIG. 2 a resource block 201 is 12 subcarriers wide and 0.5 ms in duration. It can also been seen that some physical resource blocks of the subframe can contain PUSCH resource blocks 202 and PUSCH demodulation reference symbols (DM-RS) 203.

Also in LTE a form of code division multiplexing may be used in order allow multiple UEs to transmit during a same resource block, thus increasing capacity. The uplink control information data, which includes resource request messages, modulate constant amplitude zero auto-correlation (CAZAC) sequences in order to multiplex multiple messages onto a single resource block. CAZAC sequences of length 12 are utilised in order to correspond to the number of subcarriers in a resource block so that orthogonal sequences may be generated from any of the 12 cyclic shifts of CAZAC sequence. The cyclic shift is configured per UE and it is possible that up to 12 UE PUCCHs can be multiplexed into one resource block. However, fewer than 12 may be used in order to improve detection performance at the eNodeB.

The overall PUCCH resource is a combination of parameters specific to each PUCCH format.

Parameterising the set of physical transmission parameters for each format is a PUCCH resource) index $n_{PUCCH}^{(1)}$, $n_{PUCCH}^{(2)}$, or $n_{PUCCH}^{(3)}$ for formats 1/1a/1b, 2/2a/2b, or 3 respectively.

$n_{PUCCH}^{(1)}$ derives the UE's cyclic shift and an orthogonal Walsh or discrete Fourier transform (DFT) cover code;

$n_{PUCCH}^{(2)}$ derives the UEs cyclic shift;

$n_{PUCCH}^{(3)}$ derives an orthogonal DFT cover sequence (there is no CAZAC sequence in format 3 and thus no cyclic shift).

In format 1/1a/1b and 2/2a/2b, the cyclic shift implies the logical resource block by formula. In a mixed resource block, which cyclic shifts are for format 1/1a/1b is given by a parameter $N_{CS}^{(1)}$, and the rest can be for format 2/2a/2b. In total, PUCCH resources available for format 1/1a/1b are the cyclic shifts aggregated from the mixed resource block and those from format 1/1a/1b resource blocks. To further increase capacity, in addition to the CAZAC modulation described above, cover codes to further orthogonalise transmissions may be used, where the cover codes are determined by $n_{PUCCH}^{(1)}$. Of the available PUCCH 1/1a/1b resource indices, some are reserved for resource request message transmission and a UE's resource request message resource index is explicitly signalled by the radio resource controller in $n_{PUCCH,SRI}^{(1)}$. In later releases of LTE a resource request message may be sent on up to two antenna ports is allowed by the eNodeB. If two-antenna transmission is configured then $n_{PUCCH,SRI}^{(1)}$ may be configured separately per port as $n_{PUCCH,SRI}^{(1,0)}$ and $n_{PUCCH,SRI}^{(1,1)}$.

Although the aforementioned formats determine in what resources a resource request message may be transmitted within a subframe, they do not determine during which subframes resources request messages may be transmitted. Instead, this scheduling may be determined by a further parameter, which in LTE is a radio resource controller (RRC) physical layer parameter $I_{SR}$ which indicates the periodicity and the offset in terms of subframes relative to a radio frame in which a UE may transmit a resource request message. This parameter may be included in system information or downlink control information transmitted to UEs so that all UEs in a cell can receive the scheduling. When this parameter is known a UE may then transmit a resource request message in the next available resource request message subframe as indicated by $I_{SR}$.

Figure 3:
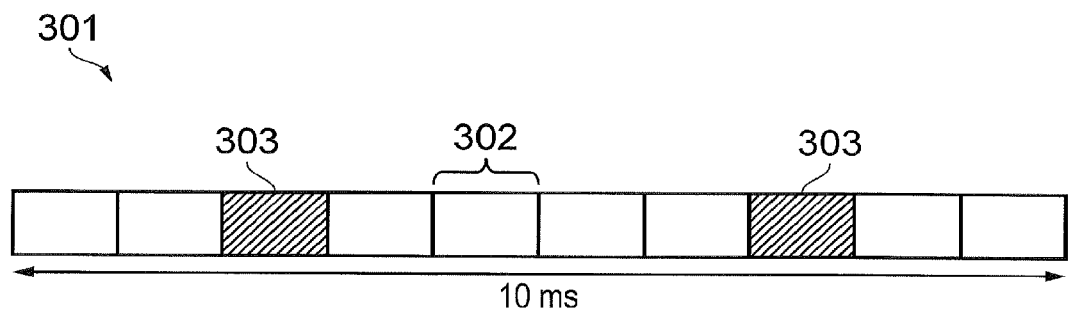
FIG. 3 provides a schematic diagram of resource request message subframe allocations in an LTE communications system.
Figure 4:
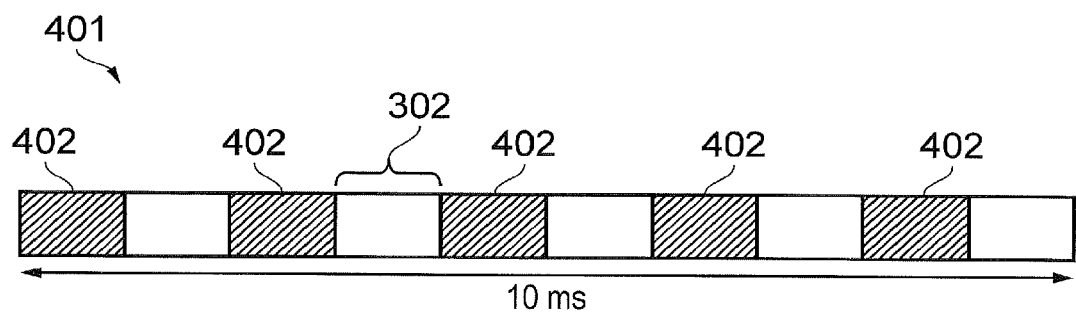
FIG. 4 provides a schematic diagram of resource request message subframe allocations in an LTE communications system.

FIGS. 3 and 4 provide an illustration of the periodicity and offset set of the subframes in which resources request messages may be transmitted. In FIG. 3, a radio frame 301 formed from 10 subframes 302 is illustrated. The shaded subframes 303 represent the subframes in which a resource request message may be transmitted. In particular, resource request messages may be transmitted in the third subframe and the eighth subframes such that their periodicity is 5 and the offset is three subframes from the beginning of the radio frame. That is to say that the implied LTE parameter $N_{OFFSET,SR}=2$ subframes after the first subframe of the radio frame. In FIG. 4 a second example radio frame 401 is illustrated, where the periodicity of the resource request message subframes 402 is two and the offset zero.

In order to limit congestion when multiple UEs transmit resource request messages, a timer may exist at UEs which commences when a resource request message is transmitted. Whilst this timer is running the UE is prohibited from transmitting a subsequent resource request message if it has not yet received a resource grant from the serving eNodeB. If a resource allocation message has not been received when the timer expires the UE may then transmit a subsequent resource request message, dependent on if the total number of transmissions of pending resource request messages is below a predetermined maximum number since a counter of the number of transmissions of resource request messages was set to zero, which can occur when the UE receives a suitable resource allocation message from the serving eNodeB. If this maximum number is reached and a resource allocation message indicating the resources allocated to the UE has not been received, the UE may resort to performing a random access resource request as previously described. In LTE, in order to simplify the resource request procedure, the resource request message is transmitted as ON/OFF keying and therefore at the serving eNodeB the presence of a resource request message can be detected by simply detecting the presence of energy in the appropriate portion of the specified resource request message subframes.

Prioritised Resource Allocation Messages

As described above, a resource request message may be triggered by the reception of data or the priority of data in the buffers that store data for transmission from the UE to the eNodeB. However, although a resource request message may be triggered by a change in priority of data, conventionally the serving eNodeB is not provided with any indication of the priority of the data that has triggered a resource request message. Consequently, it is not possible for an eNodeB to prioritise the allocation of resources to UEs which have high priority data in their buffers until much later than when a buffer status report has been received. An effect of this is that resources for transmitting a buffer status report may not be allocated promptly to UEs which may have high priority data. Consequently, this may lead to increased congestion and decreased efficiency in terms of network resource allocation and power consumption at UEs. This may be especially true at times of high uplink load in a cell when resource request messages triggered by low priority data may interfere with resource request messages triggered by high priority data. For instance, in a scenario where a number of MTC devices are functioning as smart electricity meters in close proximity, if a local disruption to the electricity supply occurs a large number of the smart meters may attempt to initiate communications with the eNodeB. Consequently, a large number of resource request messages will be transmitted during a short period of time. However, there may also be smart meters served by the same eNodeB which do not have any urgent need to communicate with eNodeB but are nevertheless performing a regular scheduled transmission. Utilising the resource allocation procedure described above would lead to inefficiencies in the allocation of uplink resources for transmitting buffer status reports because those smart meters with non-urgent data will be given then same priority in transmitting their buffer status reports as the smart meters with urgent data. Furthermore, since a UE will repeatedly try to send a resource request message that is not met with a resource allocation, even low-priority data will consume UE power and uplink resources. Therefore enabling UEs to convey information on the priority of the underlying data to be transmitted as part of the initial resource request message would be beneficial in terms of the quality of service provided to UEs and power consumption at UEs.

Priority Via Subframe Timing

In accordance with an example embodiment a characteristic of the resource request message for requesting resources for a buffer status report is utilised to provide an indication of the priority of the buffered data which is to be transmitted to the eNodeB. Multiple priority levels are defined by the network such that resource request messages triggered by data with a variety of priority levels can be differentiated. In one example the priority of a resource request message is indicated by the timing of the transmission of the resource request message relative to a set of resource request message subframes. Defining a set of resource request message subframes associated with each priority level allows the priority level of data associated with a resource request message to be indicated by transmitting the resource request message in a subframe associated with the desired priority level. For example, a UE wishing to send a resource request message and indicate a particular traffic priority level may do so by transmitting the resource request message in the next available subframe associated with the desired priority level rather than in the next available subframe for any resource request message as would be the case for existing systems.

Figure 5:
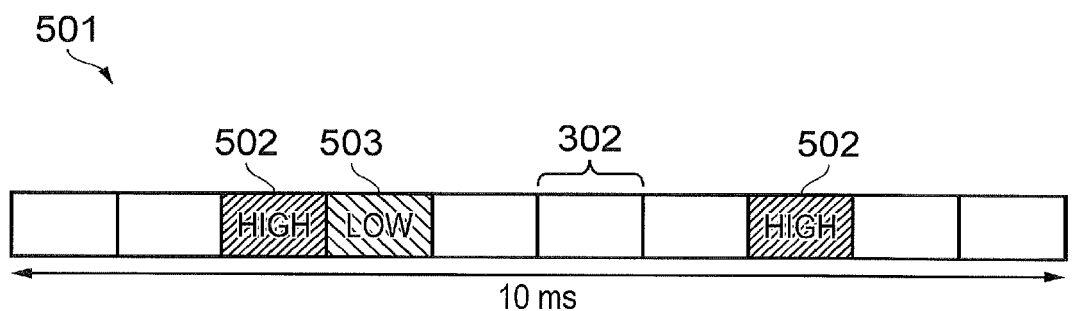
FIG. 5 provides a schematic diagram of prioritised resource request message subframe allocations in accordance with an example of the present invention.

FIG. 5 provides a schematic diagram of a radio frame 501 in which the above described technique is implemented. In FIG. 5 two priority levels have been defined: high and low. Subframes 502 represent the subframes in which transmitted resource request message will be interpreted by the serving eNodeB as being triggered by high priority data and subframe 503 represents a subframe in which transmitted resource request messages will be interpreted by the serving eNodeB as being triggered by low priority data. As one can see from FIG. 5, the periodicity and offset of the high and low priority subframes are different. The high priority subframes have a periodicity of five subframes and an offset of two subframes, and the low priority subframe has a periodicity of 10 subframes and an offset of eight subframes. The increased periodicity and or reduced offset of the high priority subframes allows resource request messages which have been triggered by high priority data to be on average transmitted with a reduced delay compared to resource request messages triggered by lower priority data. This therefore also has a knock-on effect on the delay associated with transmitting the underlying data.

Figure 6:
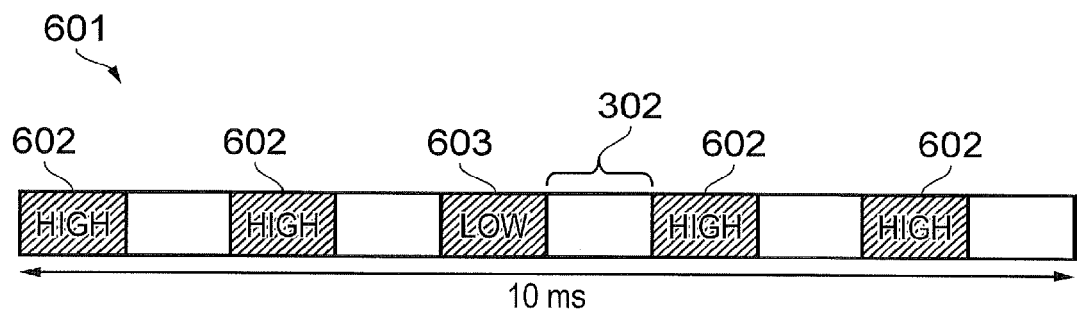
FIG. 6 provides a schematic diagram of prioritised resource request message subframe allocations in accordance with an example of the present invention.

FIG. 6 provides a second schematic diagram of a radio frame in which the above described technique is implemented. In FIG. 6 the radio frame 601 has a resource request message subframe periodicity of two and an offset of zero. However the subframes have been divided into high priority subframes 602 and low priority subframes 603 at a ratio of 4:1 so that there is an increased capacity and a reduced delay for high priority resource request messages. The division of subframes between high and low priority may in some examples change from radio frame to radio frame or the periodicity and offset may change as well as the division between high and low priority. However, such an implementation may require additional signalling so that UE can be informed of the changing subframe allocations. Such signalling may be included in system information transmission or a dedicated UE configuration for example. In some examples, the periodicity and offset of the subframe allocations for each priority level may be signalled individually either as bit maps or as an indicator parameter such as $I_{SR}$, and if conflict occurs between priority levels in a subframe, either the higher or lower priority subframe takes precedence. In yet other examples, the allocation of subframes to priority levels may be signalled via bitmaps that span one or more radio frames and this signalling may for example also be included in system information signalling such that a UE entering a cell can acquire knowledge of the priority levels and resource request message subframe allocations. As well as being periodic, the subframe allocations of FIG. 6 may also be aperiodic so that additional high priority subframes can be provided when there are expected to be an increased number of high priority resource request messages. This would then overcome the need to consistently provide a larger number of high priority subframes compared to lower priority subframes. However, additional low priority subframes may also be provided if these are required. Although in FIGS. 5 and 6 all the subframes available for resource request message transmission have been allocated a priority level, in some examples there may be resource request message subframes which are not allocated a priority level and in which resource request messages that do not have a particular priority level are transmitted, or the priority level of a resource request message is not indicated. Also, as previously mentioned, two or more priority levels may be defined and therefore two or more sets of subframes may be implemented in a system.

In the case of LTE legacy UEs which may not have resource request message priority capabilities, they may continue to operate with conventional resource request message subframe allocations and the difference taken account of at the serving eNodeB. For example, the sets of subframes for each priority level may all be members of the overall set of resource request message subframes so that even if a device does not have knowledge of the subframe priority it will still transmit a resource request message in an allowable subframe. The eNodeB can distinguish such and all UEs by virtue of the resource indices, cyclic shifts, cover codes, etc. that they have each been configured to use.

In some example embodiments, a UE may be configured to after the priority with which a resource request message is sent each time a repeated resource request message is transmitted. For instance, the priority of a message may be increased with each transmission of the related resource request message, or if the data which triggered the resource request message is low priority, the priority may be decreased in an effort to reduce congestion in the network. However, both of these implementations are dependent on there being available priority levels above and or below the current priority level with which the resource request message has been transmitted. Whether a UE is allowed to alter the priority of a resource request message after it is triggered could be a configurable behaviour per-cell or per-UE, or could be provided permanently by specification and hardcoding. Similarly, the manner of alteration could also be hardcoded, broadcast or configured per-UE for example. For example, upon each repeat of a resource request message, the priority level is automatically incremented by one level, or that the size of the increment grows or diminishes on each repeat, or the priority level could be incremented only on repetition numbers r satisfying r mod N=0, when r and N could also be different per-UE, per-cell or defined by specifications and hardcoded into UEs.

When an eNodeB receives a resource request message with a priority indication it may take the priority into account when allocating resources. For instance, if a high priority resource request message is received from a UE, resources may be allocated to this UE before resources are allocated to UEs which have pending lower priority resource requests. However, an eNodeB receiving a resource request message which indicates a priority level is not necessarily required to take the priority into account in its resource allocation decisions, and may not inform the UE of whether or not it has. The eNodeB may also cancel, reinstate, or amend a UE's priority-to-subframe mapping semi-statically. An amendment may also be made by cell-specific signalling using system information for example. A UE receiving the system information may for instance then automatically treat resource request messages associated with particular services such as the Earthquake and Tsunami Warning Service (ETWS) or the Commercial Mobile Alert Service (CMAS) as high priority and or to down prioritise other sources of data.

In systems operating in accordance with the examples described above, it may be beneficial from a UE's perspective to always indicate the highest data priority level available, regardless of the actual level. It may therefore be necessary to define rules for how UEs should behave with respect to selecting priority levels. A UE deviating from the rules may fail conformance testing and may not be allowed to operate thus ensuring correction operation of a system.

Although eNodeBs operating in accordance with the aforementioned examples may be provided with an indication of the priority of the underlying data which triggered the resource request message, the priority of data is required to be determined at the UE. The priority of data may be determined based on a number of factors, for example whether it is urgent, e.g. the underlying data is send promptly such as when a gas leak occurs. However, other more general rules for determining priority may be set. Priority may be determined based on the application the data is being transmitted to or from, any quality of service requirements associated with the data, or the type of data. These rules may be hardcoded into UE and/or may be configured by a serving eNodeB so that it can control the mapping between data type and priority.

As previously mentioned, a buffer status report and associated resource request message may be triggered by data from groups of logical channels and therefore can relate to data of more than one priority. Consequently, it may be required that a UE select which priority to associate with a resource request message. In some examples the UE may selected the highest priority of any data, an average priority weighted by the amount of data of each priority, or the median priority, etc., with suitable rounding where necessary. The rules for determining priority in this scenario may be predetermined and hardcoded into the UE or may be signalled by eNodeB to induce different behaviours for UEs of different types. For instance, at smartphones a highest priority level may be used whereas in at MTC devices a lowest priority level may be used.

In some examples the use of multiple priority levels may result in the aforementioned resource request message timeout time becoming redundant. For instance, instead of resorting to a random access procedure when a resource allocation has not been received by the end the resource request timer, the UE may instead send resource request messages with a lowest priority once a certain number of unsuccessful requests have been made. The UE may then continue sending these until a resource allocation is received or it is not possible to transmit resource request messages any longer, for example if the UE has moved out of the coverage area of the serving eNodeB.

Priority Via Antenna Selection

In another example embodiment a priority associated with a resource request message may be indicated by the antenna or antennas from which the resource request message is transmitted. For example, if a UE includes two antennas a resource request message may be transmitted by a first antenna, a second antenna or both antennas, therefore indicating one, two or three possible priority levels. If a resource request message with antenna based priority is transmitted during a subframe with which no priority level is associated the priority level of the resource request message may be solely determined by the antennas from which it were transmitted. However, if the subframe during which the resource request message was transmitted also has a priority level associated with it, the antenna priority association may used to increase the granularity of the priority level or increase the number of priority levels available.

Priority Via Resource Index Selection

In another example embodiment, the previously described $n_{PUCCH,SRI}^{(1,a)}$ configuration for resource request messages on an antenna port a contains multiple possibilities per UE.

Consequently, the PUCCH resource indices with which the UE chooses to transmit a resource request message may be used to indicate a priority. However, although this approach may require more PUCCH resources per UE, this increase in resources may be lessened by not providing this configuration for all resource request subframes.

Priority Via Resource Request Message Amplitude

In another example embodiment, instead of utilising ON/OFF keying for the signalling of a resource request message, amplitude modulation of the resource request message may be used to indicate a priority level so that, the amplitude of the resource request message is varied. For instance, a higher amplitude may indicate a higher priority and lower amplitude may indicate a lower priority. In order to take account of path loss in this approach, the amplitude of the resource request message may be defined and measured relative to a reference symbol which has been subject to the same path loss. In LTE the reference symbol may be a demodulation reference symbol (DM-RS) for example.

Figure 7:
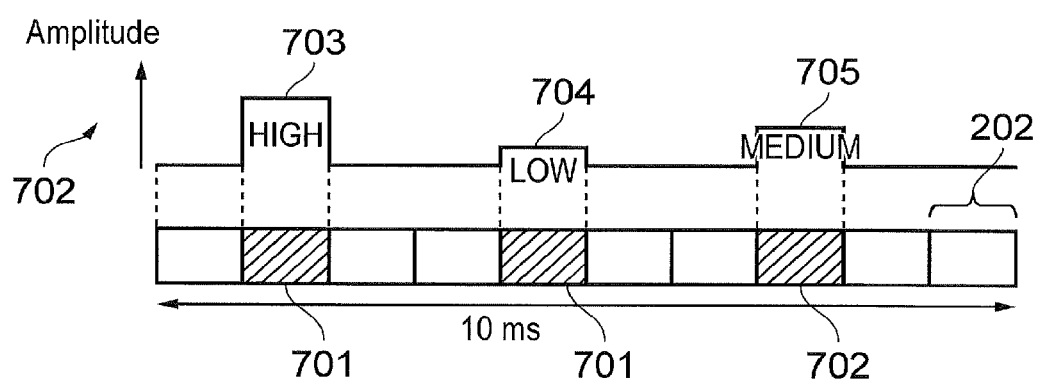
FIG. 7 provides a schematic diagram of resource request message amplitude based resource request message priority in accordance with an example of the present invention.

FIG. 7 provides a schematic illustration of this example embodiment. The subframes 701 represent resource request message subframes and amplitude plot 702 represent the amplitude with which the resource request message is transmitted. In FIG. 7 three resources request messages are sent 703, 704 and 705 and there are three possible priority levels: high, medium and low. As one can see 703 has been transmitted at a higher amplitude than 704 and 705 and therefore represents a resource request message with a high priority. Similarly 704 and 705 represent resource request messages with low and medium priorities, respectively.

This approach may be expected to have a probability of mis-detection of the transmitted amplitude, however as long as a resource allocation message is detected resources can be allocated to the appropriate UE even if with an incorrect priority. A number of techniques may be utilised to reduce these possible adverse affects, for instance, higher priorities may be associated with higher amplitudes thus reducing the possibility of failed detection or mis-detection. Alternatively, as previously described, the priority and therefore amplitude of repeated resource request messages may be increased with each repetition in order to reduce the probability of mis-detection.

Indicating priority in the variety of manners described above allows the priority of data which triggers a resource request message to be conveyed to the eNodeB without the use of additional resources in the uplink. This therefore presents a significant advantage to the systems as it may for example mean that quality of service requirements are more likely to be satisfied. The use of prioritised resource request messages may also provide additional information that the eNodeB can be utilise to improve management of a cell it serves. The various prioritisation techniques may also be combined as described for the antennas based priority and this may therefore allow an increased number of priority levels to be used or an increase in resource request messaging capacity.

Resource Request Withdrawal

In one example embodiment, in order to reduce congestion in a network an eNodeB may order that a UE withdraw resource request messages associated with data which is below a certain priority level. For example, an eNodeB may make such an order when a UE is sending a large number of resource request messages. The order may be indicated in downlink resources such as in downlink control information and the order may also only be applicable for a limited period of time. For instance, a timer may be defined which commences when a withdrawal order is received and upon expiry of the timer the UE is free to transmit lower priority resource request message once again. In some examples a plurality of timers may be defined so each priority level has an associated timer, thus providing additional adaptability in the management of the network. An alternative approach to reduce resource request message congestion is to withdraw subframe allocations for format 1/1a/1b as previously described, however, this approach is indiscriminate and does not allow for the targeted withdrawal of resource request message of a certain priority.

Figure 8:
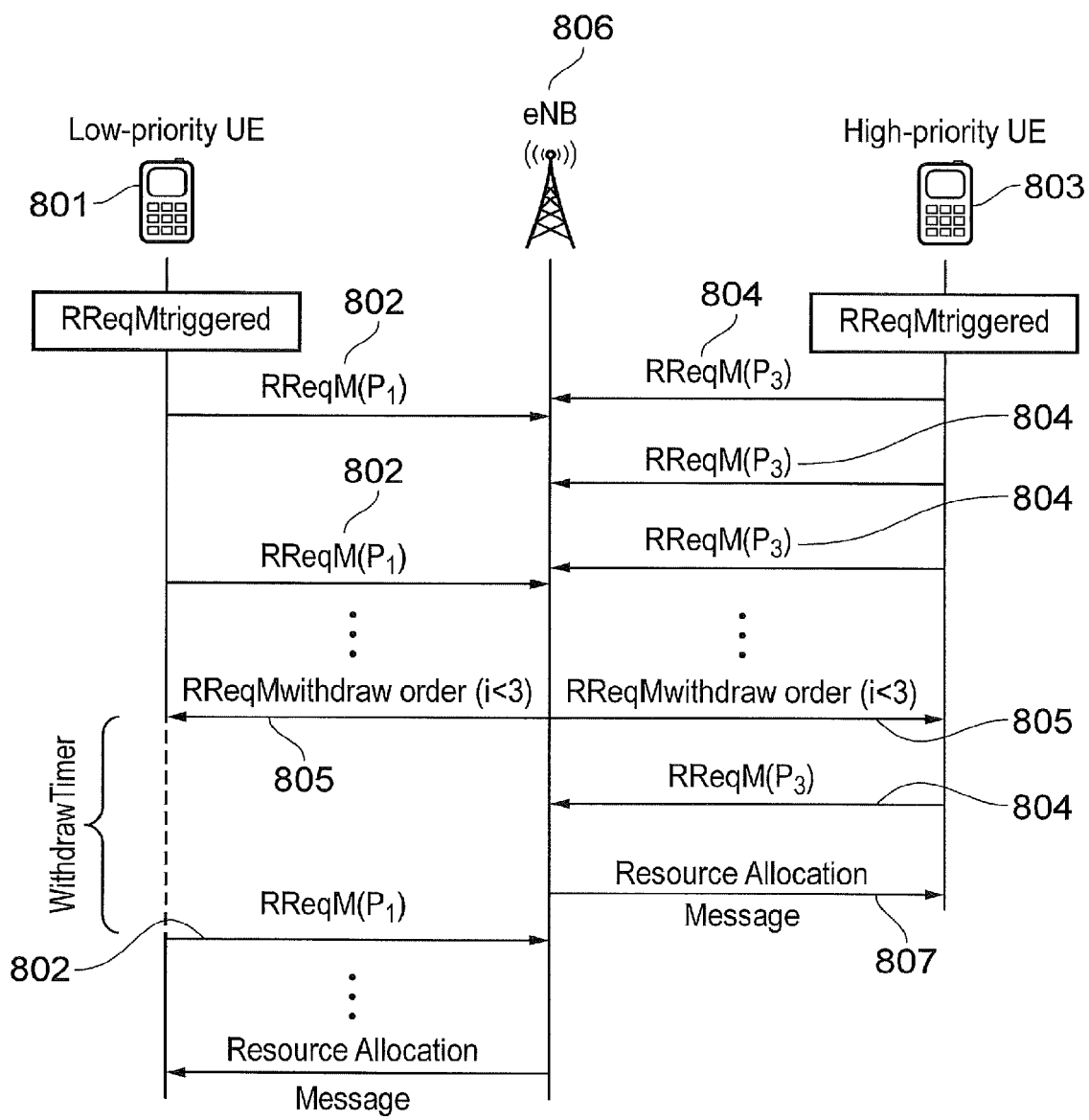
FIG. 8 provides a schematic diagram of a resource request message withdrawal procedure in accordance with an example of the present invention.

FIG. 8 provides an illustration of an example embodiment where a withdraw request procedure is implemented and resource request prioritisation is provided by a time of the transmission of the resource request message. A UE 801 is repeatedly trying to send a resource request message (RReqM) 802 with a priority $p_1$ and another UE 803 is repeatedly trying to send resource request message 804 with a higher priority $p_3$. When the resource request message withdrawal order 805 is sent, which in this example applies to priorities below $p_3$, UE 801 starts a WithdrawTimer and suspends transmission of resource request message 802 until the timer expires. However, UE 803 continues transmitting resource request message 804 until receiving a resource allocation message 807 from the eNodeB (or possibly until a maximum number of transmission TransMax is reached).

FIG. 8 also illustrates that resource allocation messages with priority $p_3$ have been allocated more resource request message subframes than those with priority $p_1$ because the resource request message 804 is transmitted at more regular intervals than resource request messages 802. If UE 801 also had pending resource request messages of priority $p_2$, and was time multiplexing them with the pending resource request messages of priority $p_3$, then the $p_2$ resource request messages would be suspended during WithdrawTimer period. The example embodiment illustrated in FIG. 8 may also be combined with other approaches which have been previously described, for instance, the UEs may be configured to increase the priority associated with a repeated resource request message and therefore a UE may naturally avoid a withdrawal order because its resource request message priority has increased above the priority specified in the withdrawal order. However, artificial elevation of priority to circumvent a withdrawal order should be discouraged, and could be prohibited in system specifications for example. In other examples, withdrawal orders may selectively applied to particular UEs and or be selectively applied by the serving eNodeB to particular services, application or types of data. For instance, if a set of smart meters require resources to report a gas leak, it may be appropriate to temporarily withdraw the right of other UEs to transmit resource request messages in order that the smart meters have priority.

In another example embodiment a UE may semi-statically provide the eNodeB with a profile of its expected data priority distribution to aid the eNodeB when or if it makes a UE-specific priority-to-subframe mapping. In LTE this may for example be done using expanded versions of the RRCConnectionRequest or RRCConnectionReestablishment messages, further detail on which can be found in the LTE standard. This approach may be useful in the case of a gas meter for example which informs the eNodeB that it may have emergency data to send, and so requests at least that the 'highest' priority-to-subframe mapping to be included in its UE-specific configuration. After receiving a UE-specific mapping, the UE may then request further higher or lower priority mappings, so that for instance, the mapping may be adjusted if the data profile at the UE changes. Alternatively, if the mapping a UE initially received is not expected to meet its needs, perhaps in terms of quality of service for example, the UE can transmit a new request informing the eNodeB of the insufficiency in its present configuration. The eNodeB may not be bound by any particular (re-)negotiation request, and may either send no reply thus leaving the original configuration in place after a predetermined period time has elapsed from the request, or the eNodeB can send an explicit 'request denied' signal. In either case it would be preferred that the UE does not repeat the renegotiation signalling in order to reduce congestion and conserve power at the UE.

Reduced Delay Priority Signalling

In the aforementioned examples, a UE buffer receives data and in response transmits a resource request message to the eNodeB so that it can transmit a buffer status report to the eNodeB. Once the eNodeB has knowledge of the data in the buffer to be transmitted, it will allocate resources accordingly. However, in one example embodiment, a delay in sending the buffered data caused by sending a buffer status report may be avoided by the eNodeB by allocating a fixed amount of uplink resources in response to the resource request message where the fixed resource allocation is dependent on the priority of the resource request message, and the UE can then transmit the data and not send a buffer status report. For instance, if a resource request message has a high priority the transmitting UE may be provided with a larger resource allocation than a UE with transmitted a low priority resource request message. Therefore high priority data may be transmitted without the need for a buffer status report transmission.

Example Usage Scenarios

Figure 9:
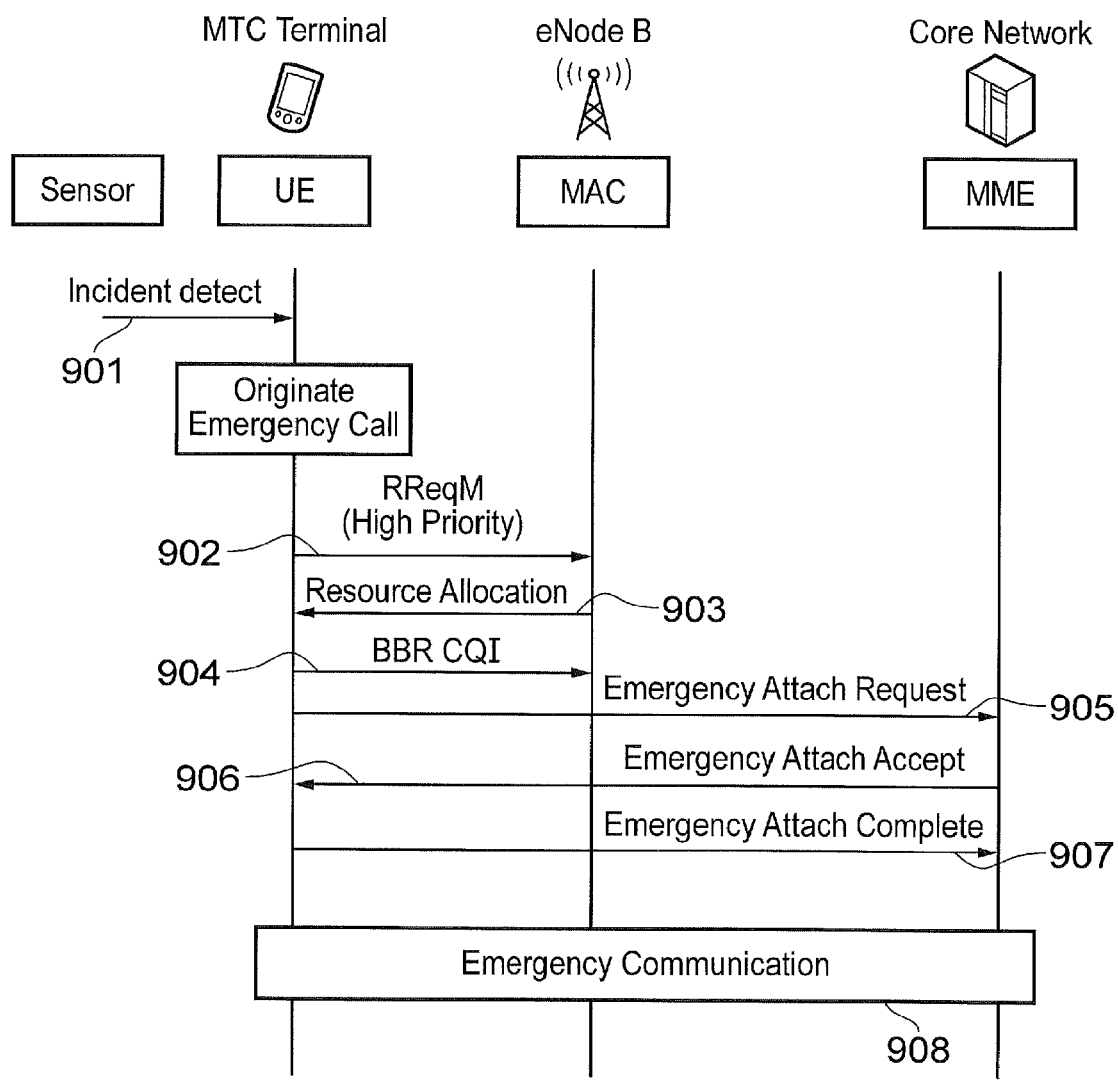
FIG. 9 provides a schematic diagram of the use of prioritised resource request messages in an emergency attach request in an LTE system.

FIG. 9 provides an example of resource request message prioritisation in an LTE system where an emergency call has been made. In LTE systems when a emergency call originates at a UE, a core network level emergency attach request message, which cannot be decoded by the serving eNodeB, is sent to the core network. Consequently, an eNodeB cannot prioritise the emergency attach request message because it does not have knowledge of its content. However, with the implementation of resource request message prioritisation, when the UE first requests resources from the eNodeB it may indicate a high priority and therefore the eNodeB can expedite a connection between the UE to the core network. In FIG. 9 an emergency event is detected at 901 and a high priority resource request message is transmitted to the eNodeB at 902. A resource allocation message 903 is then sent to the UE and the UE then transmits a buffer status report 904 to the eNodeB. Subsequently, due to the priority knowledge at the eNodeB the UE is able to send an emergency attached request 905 directly to the core network and receive an acceptance message 906 from the emergency attach request even though the eNodeB does not have explicit knowledge of the emergency attached request. An emergency attach complete message 907 can then be transmitted from the UE and the emergency connection 908 established.

In another example, the priority associated with a resource request message may be related to the bearer over which the buffered data is to be transmitted. For instance, if the buffered data is to be transmitted across a bearer which is partially defined by a low latency and low bit error rate, the priority associated with resource request message triggered by this data may be high. Likewise, for a bearer with a relatively high tolerance to latency and bit error rate, resource request messages triggered by data intended for that bearer may have a low priority.

Figure 10:
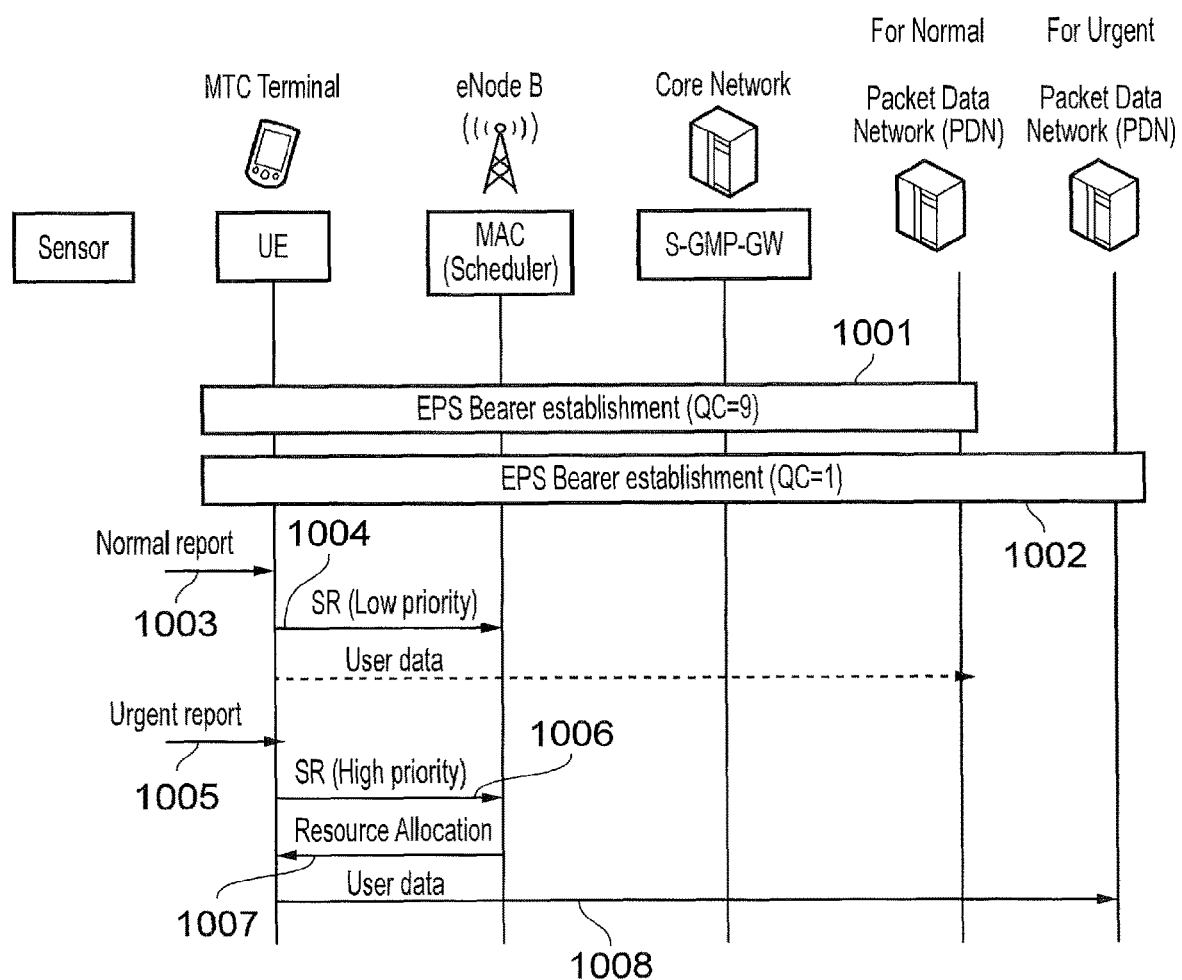
FIG. 10 provides an example diagram of the use of prioritised resource request messages in conjunction with evolved packed switched system (EPS) bearers in an LTE system.

Typical example of bearer priority is application basis. This may be mapped to Access Point Name (APN) and/or QoS class indicator (QCI). Depending on applications, the APN to establish the bearer is selected. The APN indicates the target packet data network (PDN) which has different QoS requirements. When the bearer is established, the bearer QoS characteristics are given by QCI value. FIG. 10 provides an illustration of this example where a bearer for normal data 1001 and a bearer for urgent data 1002 have been established. In response to a report 1003 intended for the normal bearer, a resource request message 1004 with low priority is transmitted to the eNodeB. However, in response to a report 1005 intended for the urgent bearer a high priority resource request message 1006 is transmitted. A resource allocation message 1007 is then transmitted to the UE and the UEs transmission of high priority data 1008 is prioritised.

Figure 11:
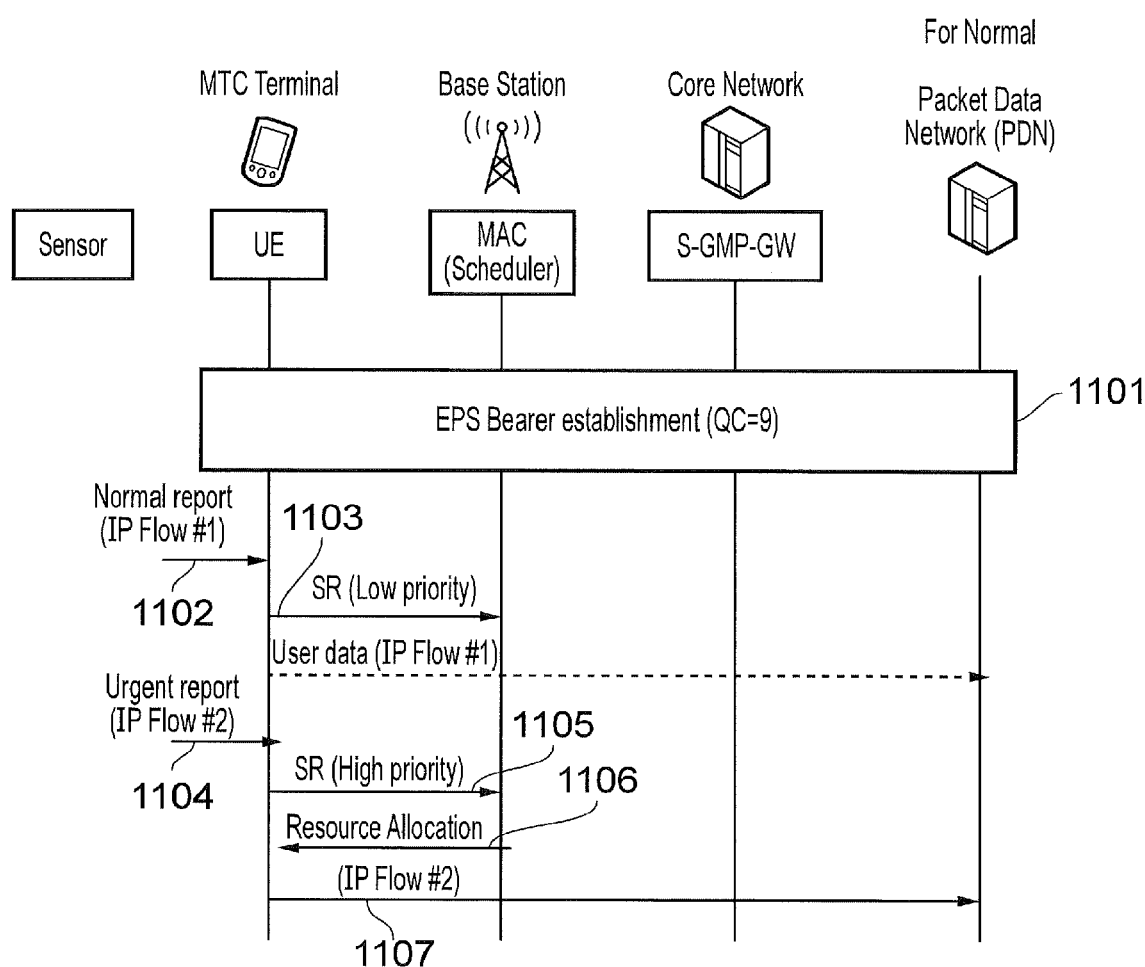
FIG. 11 provides an example diagram of the use of prioritised resource request messages in conjunction in with an IP bearer in an LTE system.

In another example, internet protocol (IP) flow based prioritisation may be used. In contrast to the example illustrated in FIG. 10, only a single bearer is used for all IP data, consequently bearer identity may not be useful in determining the priority of IP data. As an alternative the UE may be configured to recognise the application the IP data is associated with via an IP address, TCP port etc. and then assign a priority accordingly. The present example is illustrated in FIG. 11 where single bearer 1101 is established over which all IP data is conveyed. A normal report 1102 is recognised by its IP flow and therefore triggers a low priority resource request message 903. An urgent report is 1104 is recognised by the UE due to its IP flow and resource request message 1105 is therefore transmitted with a high priority. A resource allocation message 1106 is then transmitted to the UE by the eNodeB and the urgent report 1107 subsequently given priority to be transmitted over the bearer.

Figure 12:
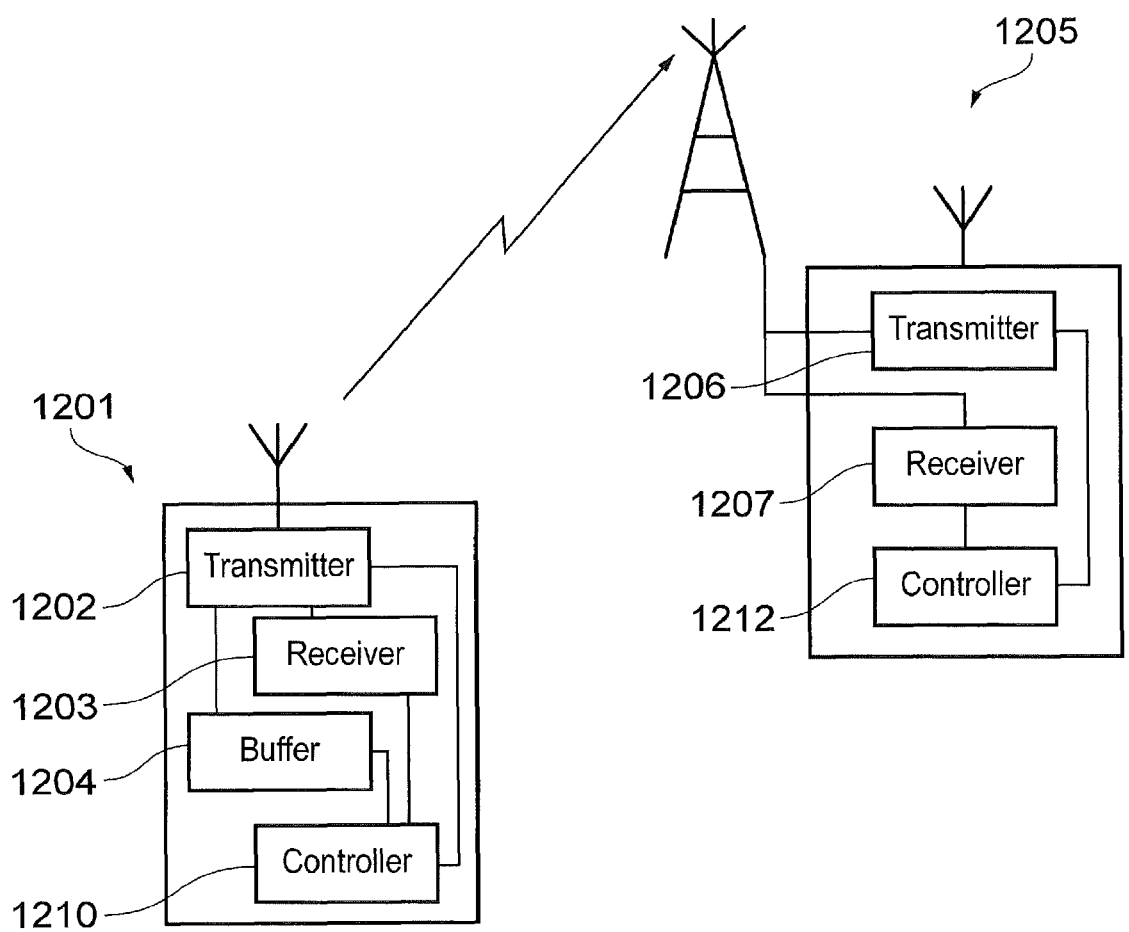
FIG. 12 provides a schematic diagram of a user device and an infrastructure equipment.

FIG. 12 provides a schematic diagram of a UE 1201 and an eNodeB 1205 in which the technique described above may be implemented. The UE includes a transmitter 1202 for transmitting data to the eNodeB 1205, a receiver 1203 for receiving data from the eNodeB 1205 and a buffered 1204 for buffering data to be transmitted to the eNodeB 1205. Under the control of a controller 1210 the transmitter 1202, the receiver 1203 and the buffer 1204 may allow the UE to send resource request messages to en eNodeB including an indication of priority of data in the buffer 1204 and to receive resource allocation messages from the eNodeB 1205. Although the UE 1201 has been illustrated as including the transmitter 1202, the receiver 1203 and the buffer 1204, the UE 1201 is not limited to including these elements and may also include further elements in addition to the controller 1210 for example. The eNodeB 1205 includes a transmitter 1206 for transmitting data to the UE 1201 and a receiver 1207 for receiving data from the UE 1201, under the control of a controller 1212. The controller 1212 may for part of a scheduler which is configured to deploy and to form a wireless access interface via which signals can be communicated between the UE 1201 and the eNodeB 1205. In combination, the transmitter 1206 and receiver 1207 may receive resource request messages indicating a priority and in response the transmitter may transmit resource allocation messages to the UE 1201. As for the UE, although the eNodeB 1205 has been illustrated as including a transmitter and a receiver, the infrastructure equipment is not limited to including these elements and may also include further elements such as memory or a controller for example.

Summary of Embodiments

Embodiments of the present technique can provide the following:

The eNB is arranged to receive additional information which it can use in scheduling UL-SCH and PUSCH resources for BSR and the traffic triggering the BSR. This can allow UEs with higher priority traffic to be served ahead of UEs with lower priority traffic, resulting in better QoS performance in E-UTRAN. This additional information is provided to the eNB without any necessary increase in the PUCCH resources over existing systems (but, depending on configuration, more PUCCH resource might be assumed granted to a given UE by the scheduler).

There is a particular advantage at times of high PUSCH/PUCCH load when it may not be possible to grant PUCCH SR resources to all UEs that would in general need it, and the eNB now has the ability to make better choices as to which UEs to give PUCCH to in such circumstances. E-UTRAN is thus able to be more sensitive to the needs of particular applications and services in crisis situations. A UE can be arranged to buffer low-priority traffic until a low-priority SR subframe occurs rather than having to send SR at the first subframe opportunity, fewer SRs might be sent for a given traffic flow, resulting in reduced UE transmission power consumption.

If there are a sufficient number of UEs which can be restricted to predominantly low-priority SR indications, and given correspondingly infrequent SR subframes (which could be only a subset of the least-frequently occurring IsR configuration), then then the present technique may allow PRACH opportunities to be scheduled more easily such that they occur in fewer of the subframes where PUCCH format 1 occurs, thus reducing the inter-carrier interference from PRACH to PUCCH format 1.

According to the present technique an eNB is provided with flexibility to change QoS and control SR. In addition to bearer level priority, MTC application level priority could be allocated.

Various further aspects and features of the present invention are defined in the appended claims and various combinations of the features of the dependent claims may be made with those of the independent claims other than the specific combinations recited for the claim dependency.

Modifications may also be made to the embodiments hereinbefore described without departing from the scope of the present invention. For instance, although the previously described embodiments have been described with reference to LTE systems, the use of prioritised resource request messages may be implemented in any communications system where a serving node performs resource allocation for the uplink of the communication system. Furthermore, although a feature may appear to be described in connection with particular embodiments, one skilled in the art would recognise that various features of the described embodiments may be combined in accordance with the disclosure.

The following numbered clauses provide further example aspects and features of the present technique:

1. A communications system for communicating data to and from a communications terminal, the communications system comprising infrastructure equipment for forming a mobile communications network, the infrastructure equipment being arranged to transmit data to and receive data from the communications terminal via a wireless access interface the communications terminal being configured to receive data for transmission to the infrastructure equipment at a buffer, to transmit a resource request message for requesting resources of the wireless access interface to the infrastructure equipment in response to receiving in the buffer the data for transmission to the infrastructure equipment, and to receive a resource allocation message from the infrastructure equipment, the resource allocation message allocating resources of the wireless access interface to the communications terminal, wherein a characteristic of the resource request message transmitted by the communications terminal to the infrastructure equipment provides an indication of one of a predetermined set of transmission priority levels for transmitting the buffered data.

2. A communications system according to clause 1, wherein the infrastructure equipment is configured
to receive the resource request message from the communications terminal,
to allocate resources in the wireless access interface to the communications terminal in response to receiving the resource request message,
to generate a resource allocation message indicating the allocated resources, and
to transmit the resource allocation message to the communications terminal, wherein the allocation of resources in the wireless access interface is dependent upon the transmission priority level for transmitting the buffered data from the set of transmission priority levels.

3. A communications system according to clause 1 or 2, wherein the communications terminal is configured to transmit a buffer status report message to the infrastructure equipment in the allocated resources, the buffer status report providing an indication of a size of the buffered data.

4. A communications system according to any of clauses 1 to 3, wherein the resource request message is a scheduling request message.

5. A communications system according to any of clauses 1 to 4, wherein the set of the priority levels for transmitting the buffered data are provided to the communications terminal by the infrastructure equipment.

6. A communications system according to any of clauses 1 to 5, wherein the wireless access interface is temporally divided into a plurality of subframes and the communications terminal is configured to transmit the resource request message in a subset of the plurality of subframes, and the characteristic of the resource request message is a timing of transmission of the resource request message relative to the subset of subframes.

7. A communications system according to any of clauses 1 to 5, wherein the characteristic of the resource request message is an amplitude of the resource request message.

8. A communications system according to any of clauses 1 to 5, wherein the communications terminal comprises a plurality of antennas for transmitting data to the infrastructure equipment, and the characteristic is the one or more antennas from which the resource request message is transmitted.

9. A communications system according to any of clauses 1 to 5, wherein the wireless access interface is temporally divided into a plurality of subframes and the communications terminal is configured to transmit the resource request message in a subset of the plurality of subframes, and the characteristic is provided from the resources within a subframe in which the resource request message is transmitted.

10. A communications terminal comprising
a transmitter unit configured to transmit signals representing data via a wireless access interface to an infrastructure equipment and a receiver configured to receive signals from the infrastructure equipment via the wireless access interface, the infrastructure equipment for forming a mobile communications network, and
a controller configured in combination with the transmitter and the receiver
to receive data for transmission to the infrastructure equipment at a buffer, to transmit a resource request message for requesting resources of the wireless access interface to the infrastructure equipment in response to receiving in the buffer the data for transmission to the infrastructure equipment, and to receive a resource allocation message from the infrastructure equipment, the resource allocation message allocating resources of the wireless access interface to the communications terminal, wherein a characteristic of the resource request message transmitted by the communications terminal to the infrastructure equipment provides an indication of one of a predetermined set of transmission priority levels for transmitting the buffered data.

11. A communications terminal according to clause 10, wherein the communications terminal is configured to transmit a buffer status report message to the infrastructure equipment in the allocated resources, the buffer status report providing an indication of a size of the buffered data.

12. A communications terminal according to clause 10 or 11, wherein the controller and the receiver are configured to receive from the infrastructure equipment the set of the priority levels for transmitting the buffered data.

13. A communications terminal according to any of clauses 10 to 12, wherein the wireless access interface is temporally divided into a plurality of subframes and the communications terminal is configured to transmit the resource request message in a subset of the plurality of subframes, and the characteristic of the resource request message is a timing of transmission of the resource request message relative to the subset of subframes.

14. A communications terminal according to any of clauses 10 to 12, wherein the characteristic of the resource request message is an amplitude of the resource request message.

15. A communications terminal according to any of clauses 10 to 12, wherein the communications terminal comprises a plurality of antennas for transmitting data to the infrastructure equipment, and the characteristic is the one or more antennas from which the resource request message is transmitted.

16. A communications system according to clause 10 to 12, wherein the wireless access interface is temporally divided into a plurality of subframes and the communications terminal is configured to transmit the resource request message in a subset of the plurality of subframes, and the characteristic is provided from the resources within a subframe in which the resource request message is transmitted.

17. An infrastructure equipment for forming a mobile communications network, the infrastructure equipment comprising
a transmitter unit for transmitting signals to a communications terminal via a wireless access interface, and
a receiver unit for receiving signals from the communications terminal, and
a controller configured in combination with the receiver unit and the transmitter unit to receive a resource request message for requesting resources of the wireless access interface from the communications terminal for the communications terminal to transmit buffered data,
to allocate resources in the wireless access interface to the communications terminal in response to receiving the resource request message,
to generate a resource allocation message indicating the allocated resources, and
to transmit the resource allocation message to the communications terminal, wherein a characteristic of the resource request message received from the communications terminal provides an indication to the controller of one of a predetermined set of transmission priority levels for allocating resources of the wireless access interface to the communications terminal to transmit the transmitting the buffered data, and the controller is configured to allocate the resources in dependence on the indicated priority level.

18. An infrastructure equipment according to clause 17, wherein the controller is configured in combination with the transmitter to transmit an indication of the set of transmission priority levels to the communications terminal.

19. An infrastructure equipment according to clause 17 or 18, wherein the wireless access interface is temporally divided into a plurality of subframes and the communications terminal is configured to transmit the resource request message in a subset of the plurality of subframes, and the characteristic of the resource request message is a timing of transmission of the resource request message relative to the subset of subframes.

20. An infrastructure equipment according to clause 17 or 18, wherein the characteristic of the resource request message is an amplitude of the resource request message.

21. An infrastructure equipment according to clause 17 or 18, wherein the communications terminal comprises a plurality of antennas for transmitting data to the infrastructure equipment, and the characteristic is the one or more antennas from which the resource request message is transmitted.

22. An infrastructure equipment according to clause 17 or 18, wherein the wireless access interface is temporally divided into a plurality of subframes and the communications terminal is configured to transmit the resource request message in a subset of the plurality of subframes, and the characteristic is provided from the resources within a subframe in which the resource request message is transmitted.

23. A method for communicating data in a communications system comprising a communications terminal and infrastructure equipment for forming part of a mobile communications network and providing a wireless access interface for transmitting data to the communications terminal or receiving data from the communications, the method comprising
receiving data at a buffer in a communications terminal for transmission to the infrastructure equipment via the wireless access interface,
transmitting a resource request message for requesting resources of the wireless access interface to the infrastructure equipment from the communications terminal in response to receiving the data in the buffer for transmission to the infrastructure equipment, and
receiving a resource allocation message from the infrastructure equipment at the communications terminal, the resource allocation message allocating resources of the wireless access interface to the communications terminal, wherein a characteristic of the resource request message transmitted by the communications terminal to the infrastructure equipment provides an indication of one of a predetermined set of transmission priority levels for transmitting the buffered data.

24. A method of communicating data from a communications terminal to an infrastructure equipment, the infrastructure equipment for forming a mobile communications network arranged to transmit data to and receive data from the communications terminal via a wireless access interface, the method comprising
receiving data for transmission to the infrastructure equipment at a buffer at the communications terminal,
transmitting a resource request message for requesting resources of the wireless access interface to the infrastructure equipment from the communications terminal in response to receiving the data for transmission to the infrastructure equipment, and
receiving a resource allocation message from the infrastructure equipment at the communications terminal, the resource allocation message allocating resources to the communications terminal, wherein a characteristic of the resource request message transmitted by the communications terminal to the infrastructure equipment provides an indication of one of a predetermined set of transmission priority levels for transmitting the buffered data.

25. A method of communicating data to an infrastructure equipment from a communications terminal, the infrastructure equipment for forming part of a mobile communications network and arranged to provide a wireless access interface for transmitting data to and receiving data from the communications terminal, the method comprising
receiving a resource request message for requesting resources of the wireless access interface from the communications terminal,
allocating resources in the wireless access interface to the communications terminal in response to receiving the resource request message,
generating a resource allocation message indicating the allocated resources, and
transmitting the resource allocation message to the communications terminal, wherein a characteristic of the resource request message received from the communications terminal at the infrastructure equipment provides an indication of one of a predetermined set of transmission priority levels for transmitting the data from the communications terminal to the infrastructure equipment.

The invention claimed is:
1. A communications terminal, comprising:
a transmitter configured to transmit signals representing data via a wireless access interface;
a receiver configured to receive signals via the wireless access interface; and
circuitry configured, in combination with the transmitter and the receiver, to
receive data for transmission at a buffer,
transmit a resource request message, the resource request message providing a request for resources of the wireless access interface for transmitting the buffered data, and
receive a resource allocation message, the resource allocation message allocating resources of the wireless access interface to the communications terminal for transmitting the buffered data, wherein
the wireless access interface is temporally divided into a plurality of subframes and the subframe chosen by the communications terminal provides an indication of one of a predetermined set of transmission priority levels for transmitting the buffered data,
wherein the communication terminal provides a further indication of the transmission priority level for transmitting the buffered data within a characteristic of the resource request transmitted on the chosen subframe, and
wherein the communications terminal comprises a plurality of antennas for transmitting data, wherein the characteristic used to distinguish the priority is the antenna on which the resource request message was transmitted.

2. The communications terminal according to claim 1, wherein the communications terminal is configured to transmit a buffer status report message in the allocated resources, the buffer status report providing an indication of the size of the buffered data.

3. The communications terminal according to claim 1, wherein the circuitry and the receiver are configured to receive the set of the priority levels for transmitting the buffered data.

4. The communications terminal according to claim 1, wherein
the communications terminal is configured to transmit the resource request message in a subset of the plurality of subframes.

5. The communications terminal according to claim 1, wherein the further characteristic of the resource request message is an amplitude of the resource request message.

6. The communications terminal according to claim 1, wherein
the further characteristic is provided from the PUCCH resource index chosen by the communications terminal to transmit the request message.

7. Circuitry for a communications terminal, the circuitry comprising:
processing circuitry configured, in combination with a transmitter configured to transmit signals representing data via a wireless access interface and a receiver configured to receive signals via the wireless access interface, to
receive data for transmission at a buffer,
transmit a resource request message, the resource request message providing a request for resources of the wireless access interface for transmitting the buffered data, and
receive a resource allocation message, the resource allocation message allocating resources of the wireless access interface to the communications terminal for transmitting the buffered data, wherein
the wireless access interface is temporally divided into a plurality of subframes and the subframe chosen by the communications terminal provides an indication of one of a predetermined set of transmission priority levels for transmitting the buffered data,
wherein the communication terminal provides a further indication of the transmission priority level for transmitting the buffered data within a characteristic of the resource request transmitted on the chosen subframe, and
wherein the communications terminal comprises a plurality of antennas for transmitting data, wherein the characteristic used to distinguish the priority is the antenna on which the resource request message was transmitted.

8. The circuitry according to claim 7, wherein the communications terminal is configured to transmit a buffer status report message in the allocated resources, the buffer status report providing an indication of the size of the buffered data.

9. The circuitry according to claim 7, wherein the circuitry and the receiver are configured to receive the set of the priority levels for transmitting the buffered data.

10. The circuitry according to claim 7, wherein
the communications terminal is configured to transmit the resource request message in a subset of the plurality of subframes.

11. The circuitry according to claim 7, wherein the implicit further characteristic of the resource request message is an amplitude of the resource request message.

12. The circuitry according to claim 7, wherein
the further characteristic is provided from the PUCCH resource index chosen by the communications terminal to transmit the request message.

13. Circuitry for an infrastructure equipment for forming a mobile communications network, the circuitry comprising:
processing circuitry configured, in combination with a transmitter configured to transmit signals to a communications terminal via a wireless access interface and a receiver configured to receive signals from the communications terminal, to
receive a resource request message for requesting resources of the wireless access interface from the communications terminal for the communications terminal to transmit buffered data;
allocate resources in the wireless access interface to the communications terminal in response to receiving the resource request message;
generate a resource allocation message indicating the allocated resources; and
transmit the resource allocation message to the communications terminal, wherein
the wireless access interface is temporally divided into a plurality of subframes and the subframe received from the communications terminal provides an indication to the processing circuitry of one of a predetermined set of transmission priority levels for allocating resources of the wireless access interface to the communications terminal to transmit the buffered data, and
the processing circuitry is configured to allocate the resources based on the indicated priority level, wherein the communication terminal provides a further indication of the transmission priority level for transmitting the buffered data within a characteristic of the resource request transmitted on the chosen subframe, wherein the communications terminal comprises a plurality of antennas for transmitting data to the infrastructure equipment, wherein the characteristic used to distinguish the priority is the antenna on which the resource request message was transmitted.

14. The circuitry according to claim 13, wherein the processing circuitry is configured, in combination with the transmitter, to transmit an indication of the set of transmission priority level to the communications terminal.

15. The circuitry according to claim 13, wherein
the communications terminal is configured to transmit the resource request message in a subset of the plurality of subframes.

16. The circuitry according to claim 13, wherein the further characteristic of the resource request message is an amplitude of the resource request message.

17. The circuitry according to claim 13, wherein
the further characteristic is provided from the PUCCH resource index chosen by the communications terminal to transmit the request message.

18. A communications terminal, comprising:
a transmitter configured to transmit signals representing data via a wireless access interface;
a receiver configured to receive signals via the wireless access interface; and
circuitry configured, in combination with the transmitter and the receiver, to
receive data for transmission at a buffer,
transmit a resource request message, the resource request message providing a request for resources of the wireless access interface for transmitting the buffered data, and
receive a resource allocation message, the resource allocation message allocating resources of the wireless access interface to the communications terminal for transmitting the buffered data, wherein the wireless access interface is temporally divided into a plurality of subframes and a characteristic of the resource request message within a subframe transmitted by the communications terminal provides an indication of one of a predetermined set of transmission priority levels for transmitting the buffered data, wherein the communications terminal includes a plurality of antennas for transmitting data, wherein the characteristic used to distinguish the priority is the antenna on which the resource request message was transmitted.

* * * * *